United States Patent
Ishikawa

(10) Patent No.: US 12,325,590 B2
(45) Date of Patent: Jun. 10, 2025

(54) LOW-TEMPERATURE STORAGE SYSTEM

(71) Applicant: TSUBAKIMOTO CHAIN CO., Osaka (JP)

(72) Inventor: Koichi Ishikawa, Osaka (JP)

(73) Assignee: TSUBAKIMOTO CHAIN CO.

( * ) Notice: Subject to any disclaimer, the term of this patent is extended or adjusted under 35 U.S.C. 154(b) by 277 days.

(21) Appl. No.: 18/143,701

(22) Filed: May 5, 2023

(65) Prior Publication Data
US 2023/0271781 A1    Aug. 31, 2023

Related U.S. Application Data

(63) Continuation of application No. PCT/JP2021/033894, filed on Sep. 15, 2021.

(30) Foreign Application Priority Data

Dec. 8, 2020 (JP) .................................. 2020-203469

(51) Int. Cl.
 *B65G 1/133* (2006.01)
 *B65G 1/04* (2006.01)
 *F25D 25/02* (2006.01)

(52) U.S. Cl.
 CPC ............. *B65G 1/133* (2013.01); *B65G 1/045* (2013.01); *F25D 25/027* (2013.01)

(58) Field of Classification Search
 CPC ........ B65G 1/133; B65G 1/045; F25D 25/027
 See application file for complete search history.

(56) References Cited

U.S. PATENT DOCUMENTS 3,750,879 A * 8/1973 Luckett .................. B65G 1/045
                                                             198/349.8
6,129,428 A * 10/2000 Helwig .................... F25D 25/04
                                                              312/305

(Continued)

FOREIGN PATENT DOCUMENTS

JP     2004-131249 A    4/2004
JP     2004-269100 A    9/2004

OTHER PUBLICATIONS

International Search Report dated Nov. 30, 2021, issued in counterpart International Application No. PCT/JP2021/033894, with English Translation. (4 pages).

(Continued)

*Primary Examiner* — Jonathan Snelting
(74) *Attorney, Agent, or Firm* — WHDA, LLP

(57) ABSTRACT

To provide a low-temperature storage system that can reduce unusable idle spaces to improve space efficiency for storing storage objects and to prevent a drop in cooling efficiency with simple structure. The low-temperature storage system includes a low-temperature storage chamber accommodating a rotary storage shelf, a moving mechanism having a holding part to carry a storage rack thereon for loading and unloading a storage object in the storage rack, and a picking stage. The holding part is located such that its center axis along a direction of its back and forth movement does not intersect a rotating shaft of the rotary storage shelf. The rotary storage shelf stores the storage rack such that the storage rack, when brought to a removal position, is oriented in a same direction as that of a storage rack placed on the picking stage.

8 Claims, 5 Drawing Sheets

(56) References Cited

U.S. PATENT DOCUMENTS

| | | | | |
|---|---|---|---|---|
| 7,314,341 B2* | 1/2008 | Malin | ............... | B65G 1/045 |
| | | | | 414/331.02 |
| 7,785,867 B2* | 8/2010 | Tamaoki | ............ | C12M 41/14 |
| | | | | 435/286.2 |
| 7,832,921 B2* | 11/2010 | Malin | ............ | A61B 10/0096 |
| | | | | 366/208 |
| 9,174,790 B2* | 11/2015 | Malin | ............... | F25D 3/102 |
| 9,199,803 B1* | 12/2015 | Morris | ............ | B65G 59/026 |
| 10,661,988 B2* | 5/2020 | Asukai | ............... | B01L 9/00 |
| 10,836,578 B2* | 11/2020 | Bokelman | .......... | B65G 1/133 |
| 10,934,090 B2* | 3/2021 | Leow | ............... | B65G 1/133 |
| 11,518,613 B2* | 12/2022 | Chen | ............... | G07F 11/005 |
| 11,897,692 B2* | 2/2024 | Krishnamoorthy | .. | B65G 47/914 |

OTHER PUBLICATIONS

Notice of Reasons for Refusal dated Mar. 30, 2021, issued in counterpart of Japanese Patent Application No. 2020-203469, with English Translation (8 pages).

\* cited by examiner

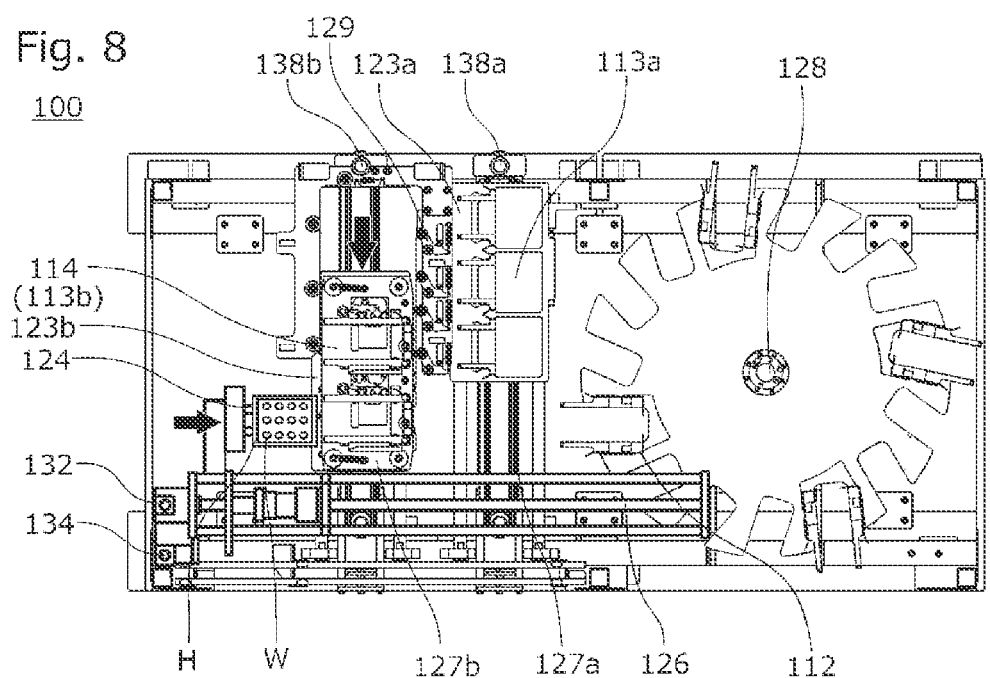
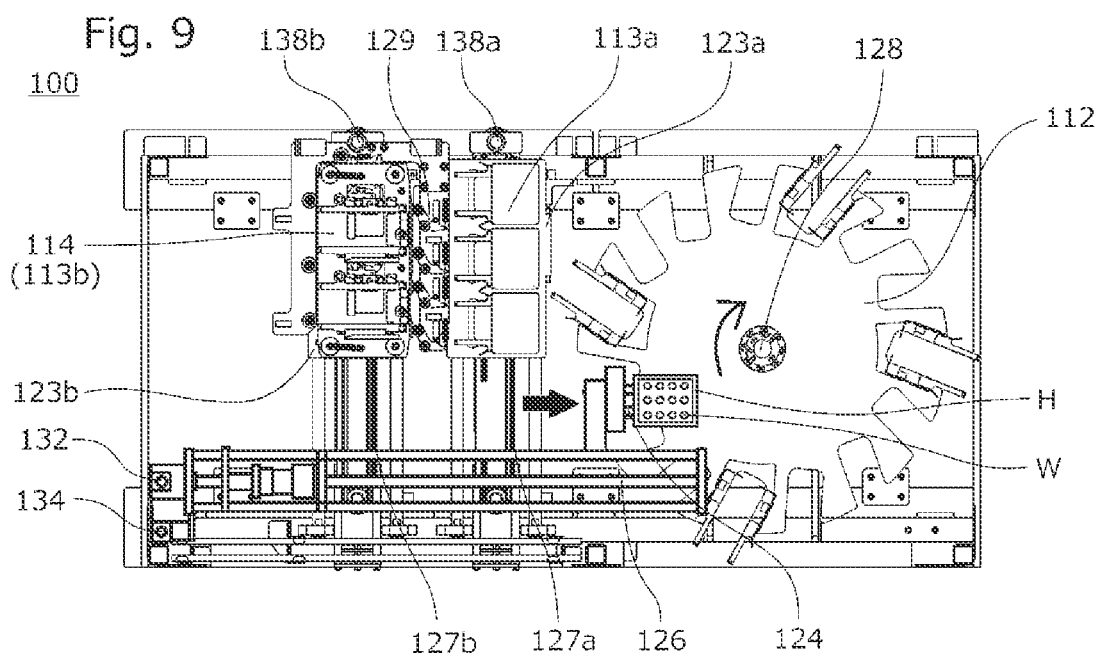

LOW-TEMPERATURE STORAGE SYSTEM

BACKGROUND OF THE INVENTION

1. Field of the Invention

The present invention relates to a low-temperature storage system that stores storage objects at low temperatures, and more particularly to a low-temperature storage system for cryogenic storage of samples and the like used in the processes of discovering or designing drugs in medical science, bioengineering, and pharmaceutical sciences.

2. Description of the Related Art

A conventional low-temperature storage system known as a compound library that stores vessels containing samples at low temperatures includes: a storage region (storage area 11) accommodating a plurality of storage shelves (vertical storage shelves 100) for storage racks (trays 10) each holding storage objects (small workpieces); an entry/exit area (13) for entry and exit of the storage objects (small workpieces) through an entry/exit window (12); and a transfer area (14) where a picking robot (20) is installed for transferring a predetermined storage object (small workpiece) between the storage region (storage area 11) and the entry/exit area (13) (see, for example, Japanese Patent Application Publication No. 2004-269100).

The low-temperature storage system (compound library) described in Japanese Patent Application Publication No. 2004-269100 further includes a plurality of temperature detecting sensors (16) inside the storage region (storage area 11), and a control device that starts and stops the horizontal circular movement of the storage shelves (vertical storage shelves 100) along an endless circulation path based on output results of the temperature detecting sensors (16).

This way, the issue of air stagnation inside the storage region (storage area 11) can be resolved without the need to provide an additional device such as a circulator fan. The revolving storage shelves (vertical storage shelves 100) can impart a uniform air flow to all the storage objects (small workpieces) inside. The low-temperature storage system (compound library) thus realizes high-density storage of storage objects (small workpieces) with high cooling efficiency.

SUMMARY OF THE INVENTION

However, the low-temperature storage system known from Japanese Patent Application Publication No. 2004-269100 still has some scope of improvement.

Namely, in the low-temperature storage system described in Japanese Patent Application Publication No. 2004-269100, when a small workpiece is transferred from one tray to another between the transfer area and the storage area, the tray is oriented to directly face the picking robot. That is, the transfer operation is performed with the tray positioned in line with the picking robot and the rotation center axis of the endless circulation path. The picking robot cannot be disposed closer to one side of the transfer area, and therefore unusable idle spaces remain on both sides of the transfer area, resulting in a larger than necessary installation space inside the low-temperature storage system as a whole, and non-optimal space efficiency for storing storage objects.

In the case where low temperature is maintained in the transfer area as well as the storage area, unusable idle spaces can lead to poor cooling efficiency, or higher energy consumption for the cooling.

The present invention solves these problems, and it is an object of the invention to provide a low-temperature storage system that can reduce unusable idle spaces to improve the space efficiency for storage objects and to prevent a drop in the cooling efficiency with a simple structure.

The present invention achieves the above object by providing a low-temperature storage system for storing storage objects contained in storage racks at a low temperature, the low-temperature storage system including a low-temperature storage chamber accommodating therein a rotary storage shelf for the storage objects contained in the storage racks; a moving mechanism having a holding part for carrying a storage rack thereon for loading and unloading the storage objects in the low-temperature storage chamber; and a picking stage allowing transfer of a storage object to the storage rack at a picking point and capable of delivering the storage rack to the holding part at a delivery position, the moving mechanism including a shuttle member configured to linearly move the holding part in a direction of back and forth movement, which is a direction in which the storage objects in the storage racks are loaded and unloaded to and from the rotary storage shelf, the holding part being movable horizontally only in the direction of back and forth movement, the holding part being located to have a center axis extending along the direction of back and forth movement without intersecting a rotating shaft of the rotary storage shelf, the rotary storage shelf storing the storage racks such that a storage rack brought to a removal position is oriented in a same direction as that of a storage rack placed on the picking stage.

According to the low-temperature storage system set forth in claim 1, the holding part is configured to be movable back and forth only in one direction horizontally. The holding part is located to have its center axis extending along the direction of back and forth movement without intersecting the rotating shaft of the rotary storage shelf. The rotary storage shelf stores storage racks such that the storage rack brought to the removal position is oriented in the same direction as that of the storage rack placed on the picking stage. This allows the removal position to be offset from the rotation center axis of the rotary storage shelf.

The moving mechanism can therefore be disposed closer to one side, i.e., closer to the wall on one side, inside the low-temperature storage chamber. This shift in the location of the moving mechanism to one side provides an extra space which may find efficient use such as for installing a picking stage or the like, or allows reduction of space usage inside the low-temperature storage chamber to enable reduction of the necessary installation space for the low-temperature storage chamber itself. Thus the space efficiency in the low-temperature storage chamber for storing storage racks can be improved, and the cooling efficiency in the low-temperature storage chamber can be increased.

The rotary storage shelf stores storage racks such that the storage rack at the removal position is oriented in the same direction as that of the storage rack placed on the picking stage. Since the moving mechanism need not change the orientation of the storage rack between the picking stage and the rotary storage shelf, the moving mechanism can have a simpler configuration, which helps minimize cost increase.

According to the configuration set forth in claim 2, the holding part is configured to be movable up and down as well as linearly in the direction in which storage objects are loaded and unloaded to and from the rotary storage shelf by means of the lift member and the shuttle member. The rotary storage shelf is configured to be able to bring a storage rack in the rotary storage shelf to the removal position by means of a rotary positioning member. Therefore, the holding part need only move in a total of two directions, i.e., up and down at the removal position to a matching height of the rotary storage shelf and back and forth in the moving direction of the shuttle member, to load and unload the storage objects in the storage racks.

This allows reduction of the installation space in a direction perpendicular to the direction of back and forth movement of the moving mechanism, and improves the space efficiency in the low-temperature storage chamber.

The picking stage is configured to be movable linearly by an auxiliary moving member from the picking point to the delivery position. The delivery position may for example be set on the axis of back and forth movement of the holding part, so that the holding part can readily transfer a storage rack containing storage objects between the delivery position and the removal position only by the back and forth movement.

According to the configuration set forth in claim 3, the moving mechanism includes an internal unit and an external unit. The internal unit includes the holding part, the lift member, the shuttle member, the rotary positioning member, and the auxiliary moving member. The external unit includes a lift transmission part, a shuttle transmission part, a rotary transmission part, and an auxiliary transmission part. Since the lift transmission part, shuttle transmission part, rotary transmission part, and auxiliary transmission part that generate driving force are located outside of the low-temperature storage chamber, heat generated by the external unit is prevented from being conducted into the low-temperature storage chamber. This helps prevent a temperature rise in the low-temperature storage chamber, and minimize energy consumption for maintaining the low temperature.

According to the configuration set forth in claim 4, the holding part is disposed closest to the picking point in the internal unit. In the case where a plurality of storage racks is aligned on the picking stage, for the holding part to transfer the storage rack farthest from the holding part, the picking stage and/or the holding part need only travel a short distance. Also, the space required for the movement of the picking stage and/or the holding part in the low-temperature storage chamber can be reduced.

According to the configuration set forth in claim 5, the rotary storage shelf is configured to be able to store a plurality of storage racks along a rotating direction of the rotary positioning member. The holding part need only move back and forth always a fixed amount in the moving direction of the shuttle member to load or unload a storage object in the storage rack that has arrived at the removal position of the rotary storage shelf. The holding part therefore does not need fine control in regard to its moving amount.

According to the configuration set forth in claim 6, an auxiliary storage shelf able to store storage objects in storage racks is further provided below the picking stage. The auxiliary storage shelf is configured to be movable linearly to the removal position by means of the auxiliary moving member. Therefore, the holding part provided for the rotary storage shelf can also be used for the auxiliary storage shelf. Since there is no need to provide another holding part, the space efficiency in the low-temperature storage chamber for storing storage racks can be further improved.

According to the configuration set forth in claim 7, the auxiliary storage shelf is configured to be able to store a plurality of storage racks along the moving direction of the auxiliary moving member. The holding part need only move back and forth always a fixed amount in the moving direction of the shuttle member to load or unload the storage rack that has arrived at the removal position of the auxiliary storage shelf. Fine adjustments of the movement of the holding part relative to the rotary storage shelf can also be used for the movement relative to the auxiliary storage shelf, which helps reduce the cost relating to the control of the holding part.

According to the configuration set forth in claim 8, a plurality of the auxiliary storage shelves is provided along the moving direction of the shuttle member, and the auxiliary moving member is configured to be able to individually move the plurality of auxiliary storage shelves at least along the moving direction of the shuttle member. When moving a target auxiliary storage shelf to the removal position for loading or unloading a storage object, at least the auxiliary storage shelves adjacent the target auxiliary storage shelf in the loading/unloading direction may be controlled not to move, so as to provide enough work space for the holding part to perform the loading or unloading of the storage object in the storage rack in a reliable manner.

BRIEF DESCRIPTION OF THE DRAWINGS

FIG. 8 is a top view of Step 4 of transferring the storage rack H in the low-temperature storage system 100 according to one embodiment of the present invention; and FIG. 9 is a top view of Step 5 of transferring the storage rack H in the low-temperature storage system 100 according to one embodiment of the present invention.

DESCRIPTION OF THE PREFERRED EMBODIMENTS

A low-temperature storage system 100 according to one embodiment of the present invention will be hereinafter described with reference to the drawings.

Figure 1:
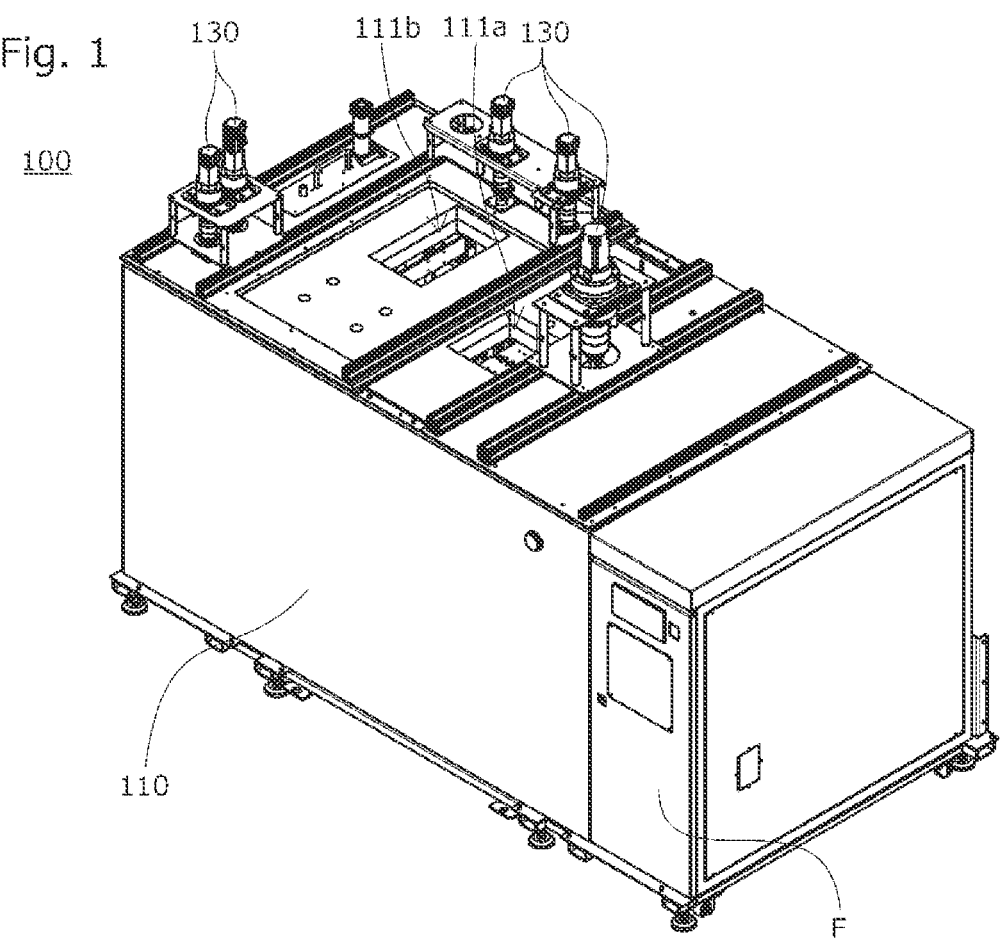
FIG. 1 is a perspective view of a low-temperature storage system 100 according to one embodiment of the present invention.
Figure 2:
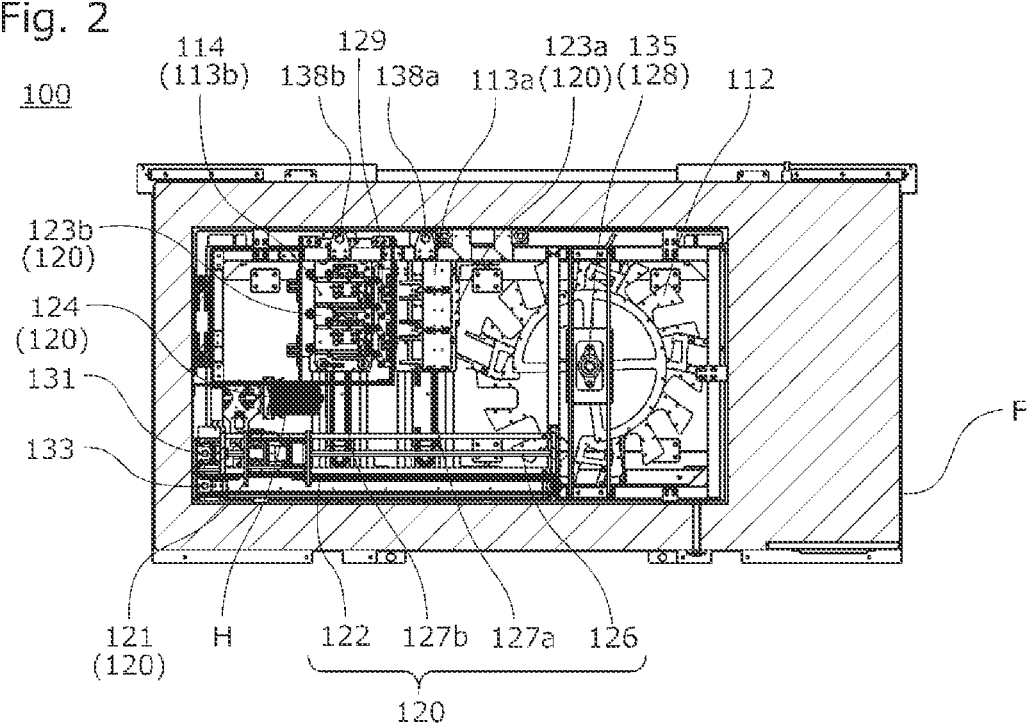
FIG. 2 is a cross-sectional top view of the low-temperature storage system 100 according to one embodiment of the present invention.
Figure 3:
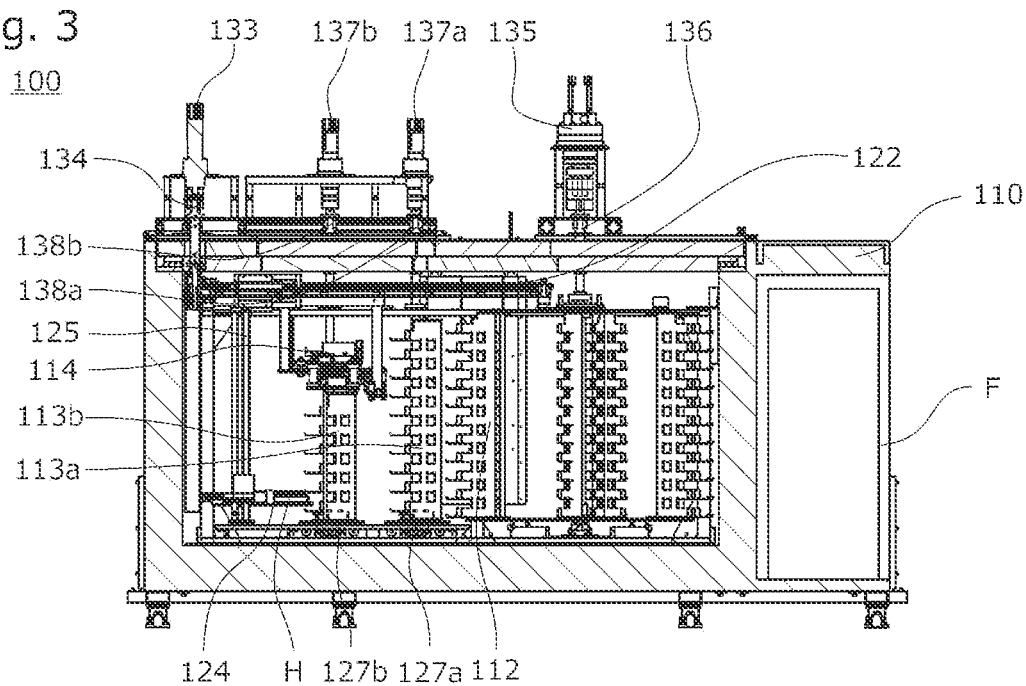
FIG. 3 is a cross-sectional side view of the low-temperature storage system 100 according to one embodiment of the present invention.
Figure 4:
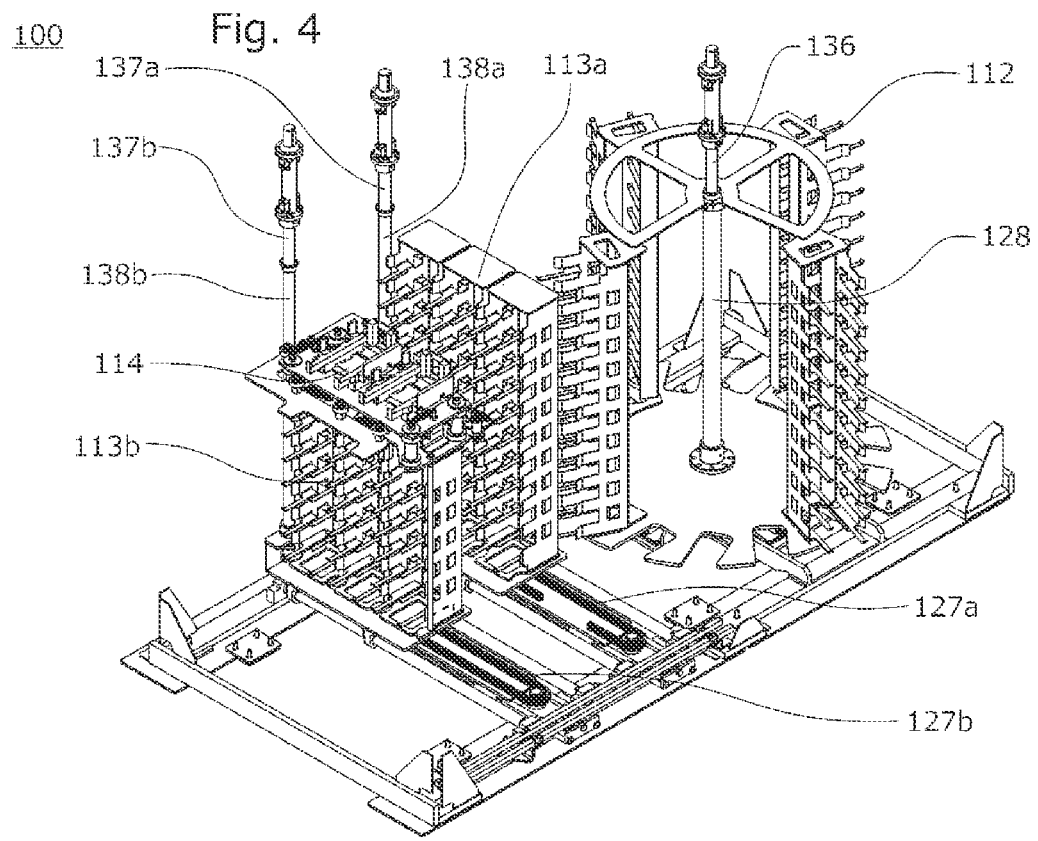
FIG. 4 is a perspective view illustrating the interior of the low-temperature storage system 100 according to one embodiment of the present invention.

For ease of explanation, FIG. 4 does not illustrate the holding part 124, components associated with the movement of the holding part 124, and the freezer F. FIG. 5 to FIG. 8 do not illustrate some of the components associated with the movement of the holding part 124 and the freezer F.

The low-temperature storage system 100 that is one embodiment of the present invention stores storage objects W contained in storage racks H at low temperatures. As shown in FIG. 1 to FIG. 5, the system includes a low-temperature storage chamber 110 accommodating therein a rotary storage shelf 112 and auxiliary storage shelves 113a and 113*b* for storage objects W contained in storage racks H, a freezer F that cools the interior of the low-temperature storage chamber 110, a moving mechanism moving the storage racks H in the low-temperature storage chamber 110 for loading and unloading storage objects W, and a picking stage 114 for allowing a picking unit (not shown) to perform picking operation to a plurality of storage racks H placed there.

The low-temperature storage chamber 110 has openings 111*a* and 111*b* facing up. The opening 111*a* is provided as part of a section where an elevator (not shown) loads and unloads storage racks H into and out of the low-temperature storage chamber 110, and the opening 111*b* is provided as part of a section where the picking unit (not shown) to be described later transfers storage objects W from one to another of a plurality of storage racks H on the picking stage 114.

The moving mechanism includes an internal unit 120 installed inside the low-temperature storage chamber 110 in a stationary manner, and an external unit 130 installed outside the low-temperature storage chamber 110.

The internal unit 120 includes a holding part 124 that holds a storage rack H containing storage objects W, a lift member 121 capable of moving the holding part 124 up and down, a shuttle member 122 capable of linearly moving the holding part 124 in a direction in which storage racks H containing storage objects W are loaded or unloaded to or from the rotary storage shelf 112, the auxiliary storage shelves 113*a* and 113*b* and picking stage 114, and auxiliary moving members 123*a* and 123*b* capable of linearly moving the auxiliary storage shelves 113*a* and 113*b* and picking stage 114 in a direction crossing the moving direction of the shuttle member 122 between a storage location and a delivery position.

The picking stage 114 is located at a picking point close to the opening 111*b*, where a positioning unit 129 is provided.

The lift member 121 is configured to be movable up and down along a vertical movement guide 125.

The shuttle member 122 is configured to be linearly movable along a shuttling movement guide 126.

The auxiliary moving members 123*a* and 123*b* are configured to be linearly movable along auxiliary movement guides 127*a* and 127*b*.

The rotary storage shelf 112 is configured in a circular shape and rotatable about a rotating shaft 128.

The external unit 130 includes a lift transmission part 131 that generates a driving force for the lift member 121, a shuttle transmission part 133 that generates a driving force for the shuttle member 122, a rotary transmission part 135 that generates a driving force for the rotary storage shelf 112, and auxiliary transmission parts 137*a* and 137*b* that generate a driving force for the auxiliary moving members 123*a* and 123*b*. The lift transmission part 131 transmits the driving force to the lift member 121 via a lift transmission guide 132. The shuttle transmission part 133 transmits the driving force to the shuttle member 122 via a shuttle transmission guide 134. The rotary transmission part 135 transmits the driving force to the rotating shaft 128 via a rotation transmission guide 136. The auxiliary transmission parts 137*a* and 137*b* transmit the driving force to the auxiliary moving members 123*a* and 123*b* via auxiliary transmission guides 138*a* and 138*b*.

Since the lift transmission part 131, shuttle transmission part 133, rotary transmission part 135, and auxiliary transmission parts 137*a* and 137*b* that generate the driving force are always located outside of the low-temperature storage chamber 110, heat generated by the external unit 130 is prevented from being conducted into the low-temperature storage chamber 110, so that a temperature rise in the low-temperature storage chamber 110 is prevented, and energy consumption for maintaining the low temperature can be kept low.

The holding part 124 is mounted to the vertical movement guide 125 to be moved up and down by the lift member 121, as well as back and forth, by the shuttle member 122 moving back and forth the whole vertical movement guide 125.

The holding part 124 is located such that its center axis along the direction of the back and forth movement does not intersect the rotating shaft 128 of the rotary storage shelf 112.

The rotary storage shelf 112 is disposed in the storage location of the low-temperature storage chamber 110, and configured to bring a storage rack H in the rotary storage shelf 112 to a removal position such that the storage rack H is oriented in the same direction as the direction of the back and forth movement of the holding part 124.

This allows the holding part 124 to be positioned such as to move back and forth along a path offset from the rotating shaft 128 of the rotary storage shelf 112 for the loading and unloading of the storage racks H. Namely, the holding part can be disposed closer to one wall of the low-temperature storage chamber 110. Thus a large space is made available on the opposite side of the low-temperature storage chamber 110 from the holding part 124, allowing space-efficient installation of the auxiliary storage shelves 113*a* and 113*b* and picking stage 114. This can improve the space efficiency in the low-temperature storage chamber 110 for storing storage racks H, and increase the cooling efficiency in the low-temperature storage chamber 110.

Next, a method of transporting storage objects W contained in storage racks H inside the low-temperature storage chamber 110 using the low-temperature storage system 100 of the present invention is described with reference to FIG. 5 to FIG. 8.

Figure 5:
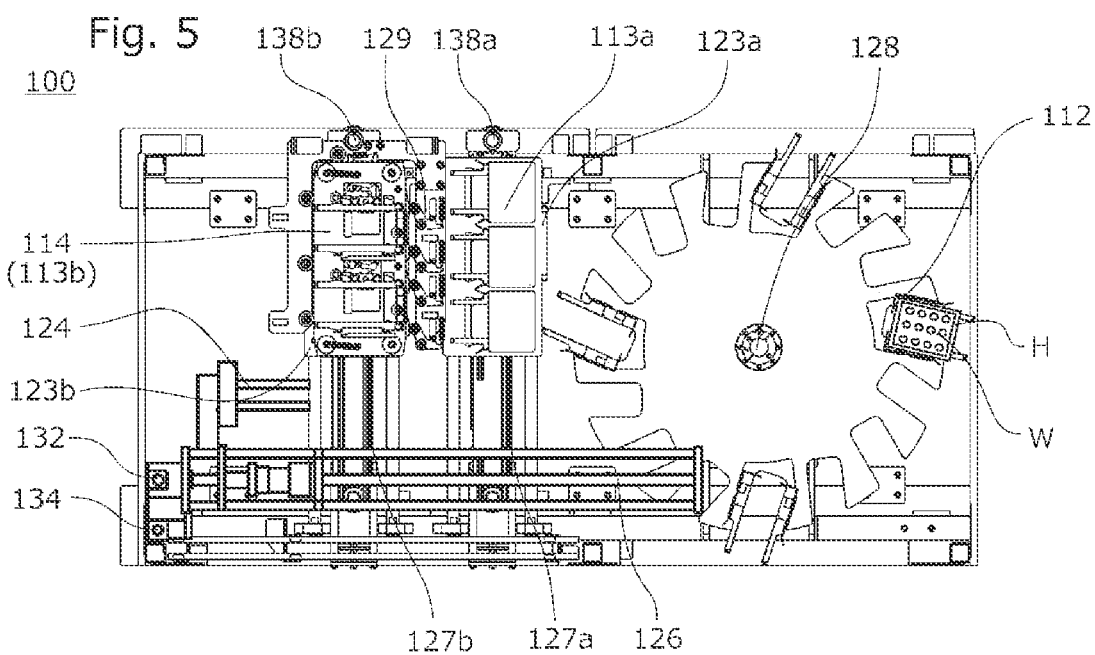
FIG. 5 is a top view of Step 1 of transferring a storage rack H in the low-temperature storage system 100 according to one embodiment of the present invention.
Figure 6:
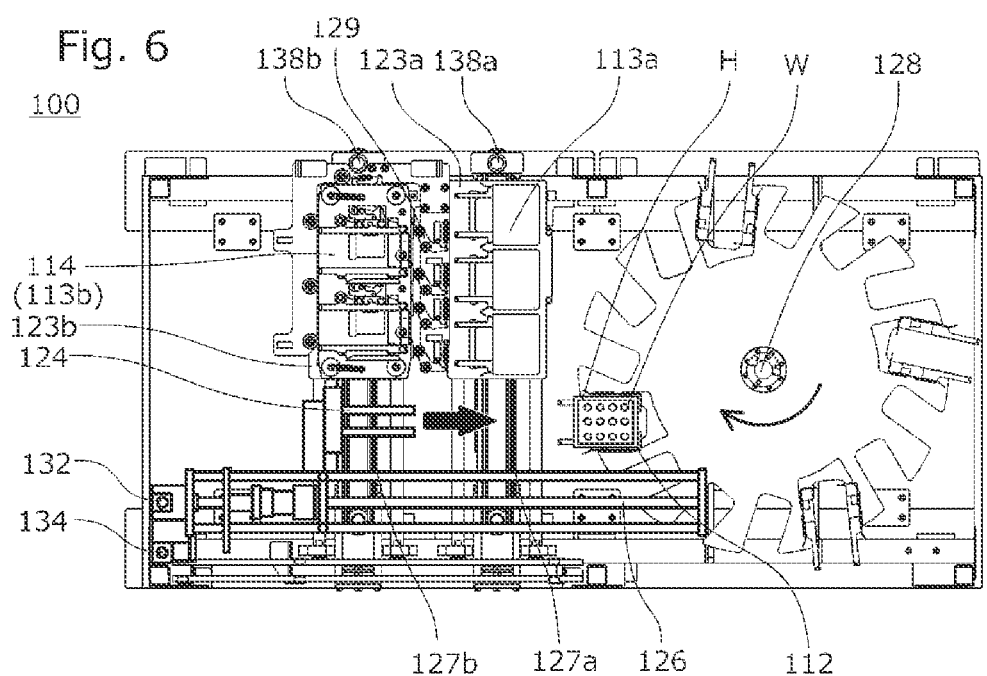
FIG. 6 is a top view of Step 2 of transferring the storage rack H in the low-temperature storage system 100 according to one embodiment of the present invention.

First, as shown in FIG. 5 and FIG. 6, the rotary storage shelf 112 is rotated about the rotating shaft 128 by the driving force from the rotary transmission part 135 to bring a storage rack H carried in the rotary storage shelf 112 to the removal position.

The holding part 124 is moved by the shuttle member 122 to the removal position while at the same time being moved up or down by the lift member 121 to a preset height of the rotary storage shelf 112 where there is the storage rack H that is to be transported.

The holding part 124 that has arrived at the removal position is further moved forward by the shuttle member 122 to below the storage rack H that is to be transported, lifted up by the lift member 121, and then moved back by the shuttle member 122 with the storage rack H held thereon away from the rotary storage shelf 112 to unload the storage rack H from the rotary storage shelf 112.

Figure 7:
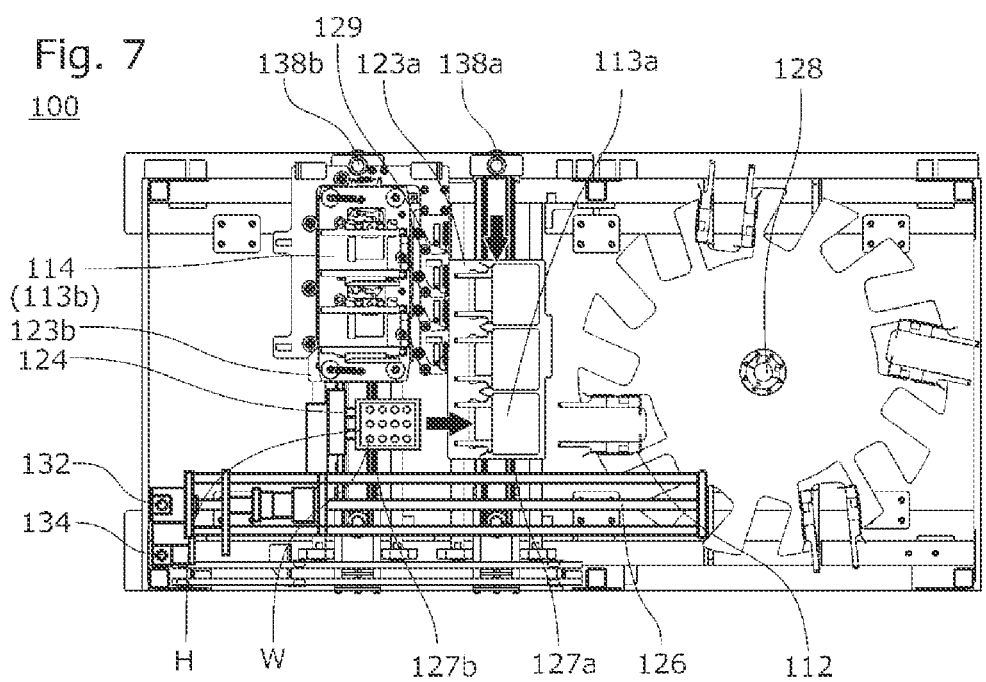
FIG. 7 is a top view of Step 3 of transferring the storage rack H in the low-temperature storage system 100 according to one embodiment of the present invention.

Next, as shown in FIG. 7, the auxiliary moving member 123*a* moves the auxiliary storage shelf 113*a* to which the storage rack H held on the holding part 124 is to be loaded to the delivery position. The holding part 124 is moved up or down by the lift member 121 to a height matching that of a predetermined loading position of the auxiliary storage shelf 113*a*, moved into the auxiliary storage shelf 113*a* by the shuttle member 122, and lowered, so that the storage rack H is placed on the auxiliary storage shelf 113*a*.

Alternatively, the auxiliary moving member 123*b* may move the auxiliary storage shelf 113*b* or the picking stage 114 to the delivery position in a similar manner as shown in FIG. 8, to load or place the storage rack H held on the holding part 124 on the auxiliary storage shelf 113b or the picking stage 114.

The picking stage 114 can carry a plurality of storage racks H aligned thereon in the direction of auxiliary movement. Storage objects W can be transferred from one to another of the storage racks H placed on the picking stage 114 at the picking point by the picking unit (not shown).

After a desired storage object W has been transferred to a storage rack H by the picking unit (not shown), the storage rack H may be held again by the holding part 124, and delivered to the elevator (not shown) that has entered the low-temperature storage chamber 110 through the opening 111a. The elevator (not shown) is then moved up to take out the storage rack H carrying the desired storage object W from inside of the low-temperature storage chamber 110.

When the elevator (not shown) enters the low-temperature storage chamber 110 through the opening 111a, the rotary storage shelf 112 must be rotated to make space directly below the opening 111a as shown in FIG. 9.

The operations described above can be performed in reverse order. Namely, a storage rack H can be loaded or unloaded to or from the removal position of the rotary storage shelf 112, or to or from the delivery position of the auxiliary storage shelves 113a and 113b or picking stage 114, with the holding part 124 alone.

As described above, the rotary storage shelf 112, auxiliary storage shelves 113a and 113b, and picking stage 114 are configured to allow loading and unloading of storage racks H along the direction of back and forth movement of the holding part 124 at the delivery position. Namely, the holding part 124 is able to load or unload storage racks H to or from the rotary storage shelf 112, auxiliary storage shelves 113a and 113b, and picking stage 114 without changing the orientation of the storage rack H and by movements only in two directions, back and forth and up and down. This obviates the need to provide an additional rotation mechanism or moving mechanism for moving the holding part 124 in the direction of auxiliary movement, or the need to provide a plurality of holding parts 124. Thus the space efficiency in the low-temperature storage chamber 110 can be improved, and cost increase can be minimized.

The rotary storage shelf 112, auxiliary storage shelves 113a and 113b, and picking stage 114 may all be shaped the same in the portion where the storage racks H are stored so that the holding part 124 can be controlled in the same manner for loading and unloading storage racks H to and from the rotary storage shelf 112, auxiliary storage shelves 113a and 113b, and picking stage 114. Thus, the cost for the control of the operation of the holding part 124 can be reduced.

The picking stage 114 is located at the picking point near the opening 111b, so that storage objects can be transferred onto a storage rack H that is to be taken out, i.e., the storage racks H in the low-temperature storage chamber 110 need not be brought out of the low-temperature storage chamber 110. Other storage objects W on the storage racks H are therefore not exposed to the heat outside the low-temperature storage chamber 110 and prevented from deterioration.

At the picking point, the positioning unit 129 keeps the storage racks H on the picking stage 114 in fixed position, so that storage objects W can be picked up and transferred by the picking unit (not shown) from one to another of the storage racks H in a reliable manner.

Since the storage objects W are transferred only near the opening 111b, the air inside the low-temperature storage chamber 110 is hardly disturbed. The heat necessarily brought into the low-temperature storage chamber 110 around the opening 111b is minimal. Thus temperature changes inside the low-temperature storage chamber 110 are kept to a minimum, which prevents deterioration of all the storage objects W inside the low-temperature storage chamber 110.

While one embodiment of the present invention has been described above in detail, the present invention is not limited to the embodiment described above. Various design changes may be made without departing from the scope of the present invention set forth in the claims.

In the embodiment described above, auxiliary storage shelves movable in the direction of auxiliary movement are provided in addition to the rotary storage shelf as a section for storing storage racks inside the low-temperature storage chamber. Storage sections inside the low-temperature storage chamber are not limited to this arrangement; for example, the auxiliary storage shelves may not be provided, or a plurality of rotary storage shelves may be provided.

In the embodiment described above, the rotary storage shelf is configured in a circular shape and rotatable about the rotating shaft. The configuration of the rotary storage shelf is not limited to this. For example, the rotary storage shelf may be formed in an oval or elliptic shape as long as the storage racks stored in the rotary storage shelf are oriented in the direction of back and forth movement of the holding part when brought to the removal position.

In the embodiment described above, for taking out a storage object, the holding part slides in below the storage rack containing the target storage object, lifts up the storage rack, and moves away from the rotary storage shelf. The method of transporting the storage object is not limited to this. For example, a chuck may be attached to the holding part for gripping and transporting the storage rack, or a hook may be attached to the holding part and hooked to a hook hole in the storage rack to transport the storage rack.

What is claimed is:

1. A low-temperature storage system for storing storage objects contained in storage racks at a low temperature, comprising:
    a low-temperature storage chamber accommodating therein a rotary storage shelf for the storage objects contained in the storage racks;
    a moving mechanism having a holding part for carrying a storage rack thereon for loading and unloading the storage objects in the low-temperature storage chamber; and
    a picking stage allowing transfer of a storage object to the storage rack at a picking point and capable of delivering the storage rack to the holding part at a delivery position,
    the moving mechanism including a shuttle member configured to linearly move the holding part in a direction of back and forth movement, which is a direction in which the storage objects in the storage racks are loaded and unloaded to and from the rotary storage shelf,
    the holding part being movable horizontally only in the direction of back and forth movement,
    the holding part being located to have a center axis extending along the direction of back and forth movement without intersecting a rotating shaft of the rotary storage shelf,
    the rotary storage shelf storing the storage racks such that a storage rack brought to a removal position is oriented in a same direction as that of a storage rack placed on the picking stage.

2. The low-temperature storage system according to claim 1, wherein the moving mechanism includes the holding part for holding the storage rack containing the storage object, a lift member capable of moving the holding part up and down, the shuttle member configured to linearly move the holding part in the direction in which the storage objects in the storage racks are loaded and unloaded to and from the rotary storage shelf, a rotary positioning member capable of rotating the rotary storage shelf about a vertical center axis to bring the storage rack in the rotary storage shelf to the removal position; an auxiliary moving member capable of linearly moving the picking stage from the picking point to the delivery position in a direction intersecting a moving direction of the shuttle member; a lift transmission part capable of transmitting driving force to the lift member; a shuttle transmission part capable of transmitting driving force to the shuttle member; a rotary transmission part capable of transmitting driving force to the rotary positioning member; and an auxiliary transmission part capable of transmitting driving force to the auxiliary moving member.

3. The low-temperature storage system according to claim 2, wherein the moving mechanism includes an internal unit installed inside the low-temperature storage chamber in a stationary manner, and an external unit installed outside the low-temperature storage chamber, the internal unit including the holding part, the lift member, the shuttle member, the rotary positioning member, and the auxiliary moving member, the external unit including the lift transmission part, the shuttle transmission part, the rotary transmission part, and the auxiliary transmission part.

4. The low-temperature storage system according to claim 3, wherein the holding part is disposed closest to the picking point in the internal unit.

5. The low-temperature storage system according to claim 2, wherein the rotary storage shelf is configured to be able to store a plurality of storage racks along a rotating direction of the rotary positioning member.

6. The low-temperature storage system according to claim 2, further comprising an auxiliary storage shelf below the picking stage, the auxiliary storage shelf being able to store the storage objects contained in the storage racks, and configured to be moved linearly by the auxiliary moving member to the removal position.

7. The low-temperature storage system according to claim 6, wherein the auxiliary storage shelf is configured to be able to store a plurality of storage racks along a moving direction of the auxiliary moving member.

8. The low-temperature storage system according to claim 6, comprising a plurality of the auxiliary storage shelves along the moving direction of the shuttle member, the auxiliary moving member being configured to be able to individually move the plurality of auxiliary storage shelves at least along the moving direction of the shuttle member.

\* \* \* \* \*